S. M. JENKINS.
METHOD OF LUBRICATION.
APPLICATION FILED JULY 12, 1912.

1,073,606.

Patented Sept. 23, 1913.

WITNESSES
R. A. Balderson
G. B. Bluming

INVENTOR
Samuel M. Jenkins
by Bakewell Byrnes & Parmelee
his attys

COLUMBIA PLANOGRAPH CO., WASHINGTON, D. C.

UNITED STATES PATENT OFFICE.

SAMUEL M. JENKINS, OF LOUISVILLE, KENTUCKY, ASSIGNOR OF ONE-SIXTH TO CHARLES C. TENNIS AND ONE-SIXTH TO E. G. RIETMAN, BOTH OF LOUISVILLE, KENTUCKY, AND ONE-SIXTH TO MARSHALL F. TENNIS, OF PITTSBURGH, PENNSYLVANIA.

METHOD OF LUBRICATION.

1,073,606.   Specification of Letters Patent.   Patented Sept. 23, 1913.

Application filed July 12, 1912. Serial No. 709,101.

*To all whom it may concern:*

Be it known that I, SAMUEL M. JENKINS, a resident of Louisville, Jefferson county, Kentucky, have invented a new and useful Improvement in Methods of Lubrication, of which the following is a full, clear, and exact description, reference being had to the accompanying drawings, forming part of this specification, in which—

Figure 1:
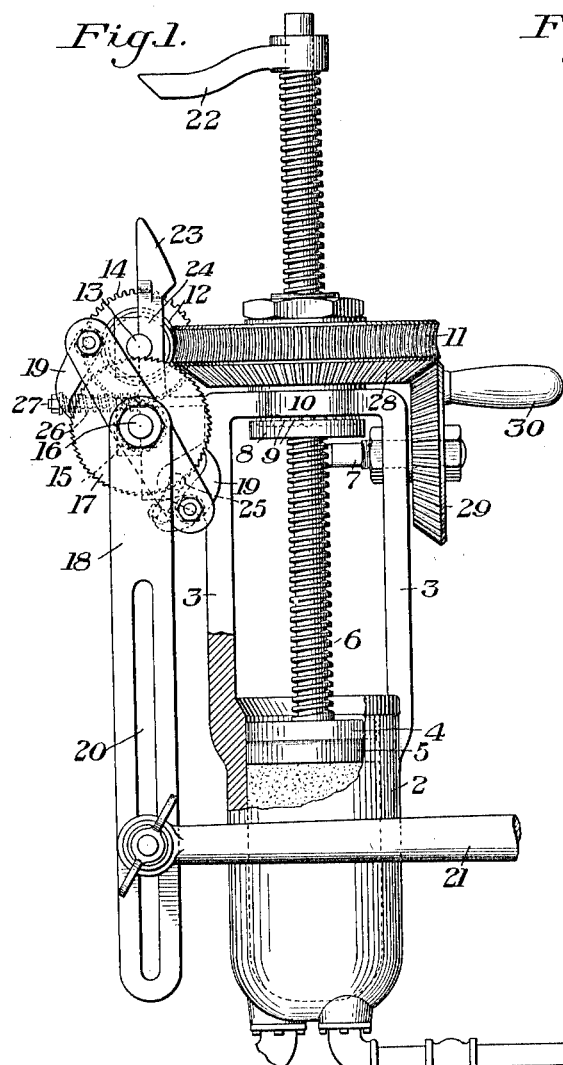
Figure 2:
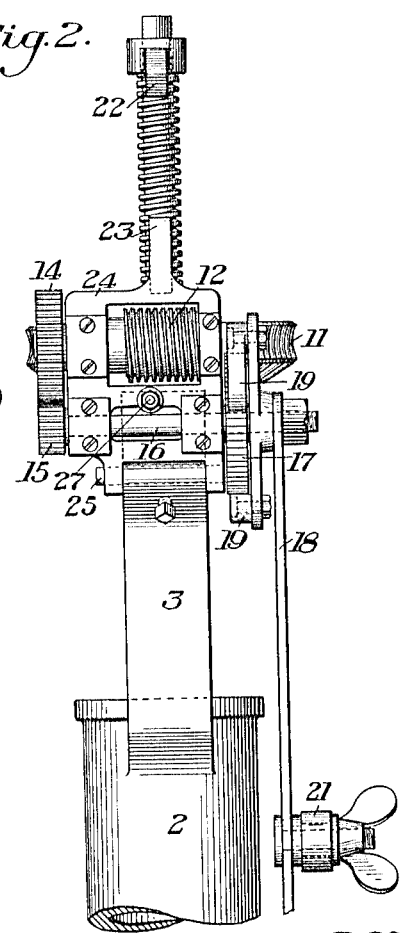
Figure 3:
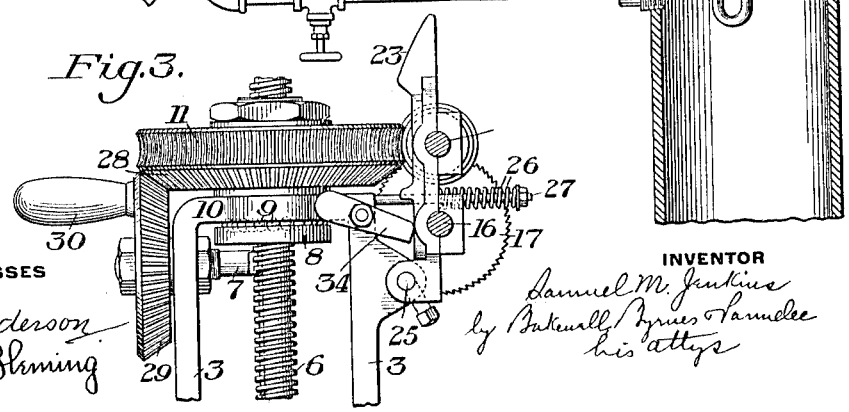

Figure 1 is a side elevation, partly broken away, showing one form of apparatus for carrying out my invention; Fig. 2 is a partial elevation of the same; and Fig. 3 is a detail view of a knock-off device which I prefer to employ.

My invention relates to lubrication, and particularly to the supplying of graphite to motive cylinders.

Heretofore it has been attempted to feed finely divided graphite, the high lubricating value of which is well known, but these attempts have not been successful. I have found that by suspending the graphite in grease which is a solid at ordinary temperatures and forcing this graphite carrying grease and heating the end of the column or rod thereof, I can insure a highly efficient lubrication.

In carrying out my inventon, I mix the graphite with grease which is of such a character as to be plastic or solid when cold, the mixture being preferably made while the grease is hot. The graphite is thus suspended in the grease, which may be sold in such shapes as are ordinarily used in screw grease cups. This grease is placed in a suitable pressure device, by which pressure may be applied to force it through a tube or pipe, which leads to a point where heat is applied to the grease so that it may be atomized and carried along by a fluid flow. For example, in applying the invention to steam engines, the tube connects with a smaller tube having at least a portion of its length within the steam pipe so that the grease will become heated before it merges from the end of this small tube. Such pressure being applied, either continuously or intermittently to the grease at the outer end of the column, its inner end will be gradually forced forward, the grease will atomize at the mouth of the exit tube and be carried along by the steam or hot fluid.

In carrying out my invention, I may employ many different types of apparatus; and in the drawings I have shown one preferred form which I have found successful in practice.

In these drawings, 2 represents a cylinder having an open upper end, and a spherical bottom, this cylinder having fastened thereto a top frame 3, which carries the feeding mechanism. The grease is forced out by a piston 4, preferably having a suitable cup leather 5, and carried at the lower end of a screw 6. This screw does not rotate, but forms a threaded stem having a splined groove along one side to receive a pin 7, adjustably held in the frame and preventing the stem from rotation.

The screw is gradually forced down by a rotary bearing 8, preferably having ball bearings 9 between it and the top bar 10 of the frame, this bearing having secured thereto a worm wheel 11, which intermeshes with worm 12 on worm shaft 13. The worm shaft 13 has a toothed wheel 14 intermeshing with pinion 15 on ratchet shaft 16 carrying ratchet wheel 17. The shaft 16 has loosely mounted thereon the ratchet lever 18 having two pawls 19 which are suitably counterweighted to engage the ratchet wheel. The ratchet lever 18 is slotted as shown at 20, so that the connecting link 21 extending from any reciprocating part of the engine or valve mechanism may be adjusted to give a longer or shorter stroke to the ratchet lever.

When the threaded stem has been forced down to the limit of its stroke, a tappet 22 secured at its top portion engages a cam 23 projecting upwardly from the swinging frame carrying the worm gear and its driving connections and thus disconnects the driving mechanism. The swinging frame 24 carrying these parts is mounted on the pin 25, and the worm is normally held in engagement by the spring 26 on the stationary pin 27 projecting from the main frame. In order to rapidly return the screw to its upper position, and also in order to temporarily feed the grease more rapidly when desired, I preferably provide the worm wheel 11 with a bevel gear portion 28, which engages a bevel gear wheel 29 driven by handle 30.

From the bottom of the cylinder 2 a pipe or tube 31 leads, and is secured in the side of the steam pipe 32. The inner end of this pipe 31 is provided with a heating and exit tube 33, which is preferably bent in its intermediate part and also preferably opens in the opposite direction to that of the steam flow indicated by the arrows.

In the use of the apparatus, the graphite-carrying grease is placed in the cylinder, the piston is brought down upon it, the feed connections are thrown into gear, and thus an intermittent turning movement is imparted to the ratchet wheel. This turning movement through the rotary bearing and threaded stem, which is internally threaded within the rotary bearing, will gradually force the plunger down, thus giving an intermittent feed for the column of grease through the pipe. As this grease is pushed through the heating and exit tube, it will become highly heated by the steam flow, and at each pulsation of the intermittent pressure, a portion of it will be pushed out of the mouth of the exit pipe and atomized and carried forward by the steam to the valves and cylinders. The graphite is thus carried in minute particles by the steam, and gives a very highly efficient lubrication.

If it is desired to disengage the feed at any time, the trigger or thumb latch 34 may be used for that purpose. This thumb latch is also weighted so as to fall by gravity into the disengaging position when the worm is forced back at the end of the feeding movement when the cylinder is practically empty.

Any suitable sight feed device may be located in an intermediate part of the grease pipe or feed line, if desired. The mixture which I prefer to employ is composed of cylinder oil, paraffin, and graphite, as set forth in my copending application No. 693,746, filed April 27th, 1912. This mixture may, however, be varied as desired, within the scope of my present invention.

The advantages of my invention result from the discovery of an efficient method by which graphite may be carried in suspension and fed to the working surfaces of prime motors, whether of the reciprocating or other type. The use of heavy grease enables the graphite to be carried in suspension, and also enables mechanical feeds to be employed while the high heating of the end of the column enables the graphite and grease to be atomized and carried under by the fluid.

Many variations may be made in the form and arrangement of the mechanical feed and other parts without departing from my invention.

By the word "plastic" in the claims, I intend to cover non-fluid grease which is of sufficient consistency to hold the graphite in suspension and prevent its settling to the bottom of the mass.

I claim—

1. The method of lubricating hot fluid actuated motors, consisting in feeding a column of plastic grease carrying graphite in suspension into the stream of hot-actuating fluid, liquefying the grease by the heat of the actuating fluid to free the graphite, and conveying it to and distributing it in the motor by the actuating fluid, substantially as described.

2. The method of lubricating steam engines, consisting in feeding a column of plastic grease carrying graphite in suspension into the live steam passing to the engine, liquefying the grease by the heat of the steam to free the graphite, and conveying it to the engine and distribute it therein, substantially as described.

3. The method of lubricating steam engines, consisting in feeding a column of plastic grease carrying graphite in suspension into the live steam, passing to the engine, liquefying the grease by the heat of the steam, and feeding it in a direction against the movement of the steam to atomize the grease to free and convey the graphite to the engine, substantially as described.

In testimony whereof, I have hereunto set my hand.

SAMUEL M. JENKINS.

Witnesses:
E. G. RIETMAN,
B. GUSVUD HERR.